(12) United States Patent
Reusens et al.

(10) Patent No.: US 6,240,129 B1
(45) Date of Patent: May 29, 2001

(54) METHOD AND WINDOWING UNIT TO REDUCE LEAKAGE, FOURIER TRANSFORMER AND DMT MODEM WHEREIN THE UNIT IS USED

(75) Inventors: Peter Paul Frans Reusens, Laarne; Paul Marie Pierre Spruyt, Heverlee, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/113,719

(22) Filed: Jul. 10, 1998

Related U.S. Application Data

(60) Provisional application No. 60/052,124, filed on Jul. 10, 1997.

(51) Int. Cl.[7] .............................. H04B 1/38; H04B 14/06
(52) U.S. Cl. ........................................ 375/222; 375/346
(58) Field of Search ................................... 375/222, 219, 375/220, 257, 346, 348, 227, 284, 285

(56) References Cited

U.S. PATENT DOCUMENTS

| 6,014,412 | * | 1/2000 | Wiese et al. | 375/346 |
| 6,035,000 | * | 3/2000 | Bingham | 375/296 |
| 6,088,386 | * | 7/2000 | Spruyt et al. | 375/222 |

FOREIGN PATENT DOCUMENTS 9421061  9/1994  (WO) .

OTHER PUBLICATIONS

ANSI Standard ANSI T1.413–1995, "Network and Customer Installation Interfaces—Asymmetric Digital Subscriber Line (ADSL) Metallic Interface".

"Performance Evaluation of a Multichannel Transceiver System for ADSL and VHDSL Services", P. Chow et al, *IEEE Journal on Selected Areas in Communications*, vol. 9, No. 6, Aug. 1991, pp. 909–919.

"A Multicarrier E1–HDSL Transceiver System with Coded Modulation", P. Chow et al, *Journal of European Transactions on Telecommunication and Related Technologies*, vol. 4, No. 3, May–Jun. 1993, pp. 23–32.

* cited by examiner

*Primary Examiner*—Chi Pham
*Assistant Examiner*—Khai Tran

(57) ABSTRACT

A windowing unit (WFU) improves band-limited noise immunity of a fourier transformer (FT) of which it is a part. The windowing unit (WFU) comprises a digital window filter (WI) and a folding processor (F). The window function (W) of the digital window filter (WI) consists of a window head (HEAD), a window body (BODY), and a window tail (TAIL), and the shape of the window function (W) is chosen so that the window head (HEAD) is complementary to a tail (BODY TAIL) of a window body (BODY), and similarly the window tail (TAIL) is complementary to a head (BODY HEAD) of the window body (BODY). The folding processor (F) performs the task of mapping the information received in the window head (HEAD) on to the tail (BODY TAIL) of the window body (BODY) and mapping the information received in the window tail (TAIL) on to the head (BODY HEAD) of the window body (BODY).

10 Claims, 4 Drawing Sheets

METHOD AND WINDOWING UNIT TO REDUCE LEAKAGE, FOURIER TRANSFORMER AND DMT MODEM WHEREIN THE UNIT IS USED

CROSS REFERENCE TO RELATED APPLICATION

This application claims priority under 35 U.S.C. §119 from U.S. Provisional Application No. 60/052,124 filed Jul. 10, 1997.

BACKGROUND OF THE INVENTION

1. Technical Field

The present invention relates to a method to reduce leakage in a fourier transformer, a windowing unit adapted to reduce leakage in a fourier transformer, a fourier transformer and a discrete multi tone modem, both including such a windowing unit and a discrete fourier transform processor coupled to the windowing unit.

2. Discussion of Related Art

Such a method and equipment to perform such a method are already known in the art, e.g. from the international patent application published under the patent cooperation treaty (PCT) with reference number WO 94/21061 and with title 'A multi-channel digital transmitter and receiver'. Therein, information signals are transmitted from a transmitter to a receiver, digitized in the latter one, windowed and discrete fourier transformed. As is stated on page 11, lines 14–19, spectral leakage may be reduced by increasing the window width using window functions with low sidelobes. As will be explained later on, spectral leakage causes band-limited noise to disturb all frequency components. Consequently, band-limited noise immunity may be improved by reducing spectral leakage using a window filter whose length is increased and whose head and tail are smoothed. The known solution of increasing the window width nevertheless requires an increased number of discrete fourier transform (DFT) points, and thus renders the transformation more complex.

SUMMARY OF THE INVENTION

An object of the present invention is to provide a method and equipment of the above known type, but which does not involve an increase of the amount of DFT points.

In accord with a first aspect of the invention, a method to reduce leakage in a fourier transformer (FT), comprises the steps of:

a. receiving an incoming signal (X) comprising data symbols with a data symbol length B; and b. windowing said incoming signal (X) by multiplying it with a window function (W) to thereby generate a sequence of windowed data symbols ($X_{SW}$), said window function (W) comprising a window head (HEAD) with a head length H, a window body (BODY) with a body length which equals said data symbol length B, and a window tail (TAIL) with a tail length T, said windowed data symbols ($X_{SW}$) having a length H+B+T.

is characterized in that said method further comprises the step of:

c. adding a symbol head of said windowed data symbols ($X_{SW}$) to a tail of a symbol body of said windowed data symbols ($X_{SW}$), and similarly adding a symbol tail of said windowed data symbols ($X_{SW}$) to a head of said symbol body of said windowed data symbols ($X_{SW}$) to thereby generate a sequence of folded windowed data symbols ($X_{SWF}$) whose length equals said data symbol length B.

According to a second aspect of the invention, a windowing unit (WFU) for reducing leakage in a fourier transformer (FT), said windowing unit (WFU) including:

a. an input terminal adapted to receive an incoming signal (X) comprising data symbols with a data symbol length B; and b. a window filter (WI), coupled to said input terminal, and adapted to window said incoming signal (X) by multiplying it with a window function (W) comprising a window head (HEAD) with head length H, a window body (BODY) whose length equals said data symbol length B, and a window tail (TAIL) with tail length T, to thereby generate a sequence of windowed data symbols ($X_{SW}$) whose length equals H+B+T.

is characterized in that said windowing unit (WFU) further includes:

c. a folding processor (F), coupled to said window filter (WI), for adding a symbol head of said windowed data symbols ($X_{SW}$) to a tail of a symbol body of said windowed data symbols ($X_{SW}$), and similarly to add a symbol tail of said windowed data symbols ($X_{SW}$) to a head of said symbol body of said windowed data symbols ($X_{SW}$), to thereby constitute a sequence of folded windowed data symbols ($X_{SWF}$) whose length equals said data symbol length B.

According to a third aspect of the invention, a fourier transformer (FT) comprising a windowing unit (WFU) and a discrete fourier transform processor (DFT) coupled to said windowing unit (WFU), said windowing unit (WFU) including:

a. an input terminal adapted to receive an incoming signal (X);

b. a sampling device (S) adapted to sample said incoming signal (X) to thereby generate a sample sequence ($X_S$) comprising data symbols with a data symbol length of B samples, B being an integer value; and c. a digital window filter (WI), coupled to said sampling device (S), and adapted to window said sample sequence ($X_S$) by multiplying it with a window function (W) comprising a window head (HEAD) with head length H, a window body (BODY) whose length equals said data symbol length B, and a window tail (TAIL) with tail length T, to thereby generate a sequence of windowed data symbols ($X_{SW}$) whose length equals H+B+T; and d. an output terminal coupled to said discrete fourier transform processor (DFT), is characterized in that said windowing unit (WFU) further includes:

e. a folding processor (F), coupled to said digital window filter (WI), for adding a symbol head of said windowed data symbols ($X_{SW}$) to a tail of a symbol body of said windowed data symbols ($X_{SW}$), and similarly to add a symbol tail of said windowed data symbols ($X_{SW}$) to a head of said symbol body of said windowed data symbols ($X_{SW}$), to thereby constitute a sequence of folded windowed data symbols ($X_{SW}$) with length B and to apply said sequence of folded windowed data symbols ($X_{SWF}$) to said output terminal.

According to a fourth aspect of the invention, a discrete multi tone (DMT) modem (MODEM) comprising between a line terminal (LT) and a modem output (O) a receiving part (R), and between a modem input (I) and said line terminal (LT) a transmitting part (T), said transmitting part (T) including the cascade connection of a serial to parallel converter (SP), a mapper (MAP), an inverse fourier transformer (IFT), a cyclic prefix adder (CPA), a parallel to serial converter (PS) and a digital to analog converter (DAC), said serial to parallel converter (SP) being adapted to parallelize a sequence of transmit bits (TB), said mapper (MAP) being adapted to allocate said transmit bits (TB) to a set of carriers to thereby constitute discrete multi tone (DMT) symbols, said inverse fourier transformer (IFT) being adapted to transform said discrete multi tone (DMT) symbols to time domain, said cyclic prefix adder (CPA) being adapted to add a cyclic prefix to said discrete multi tone (DMT) symbols to thereby protect said discrete multi tone (DMT) symbols for intersymbol interference, said parallel to serial converter (PS) being adapted to serialize said discrete multi tone (DMT) symbols to thereby generate a sequence of discrete multi tone (DMT) symbols, and said digital to analog converter (DAC) being adapted to convert said sequence of DMT symbols to analog signals, and said receiving part (R) including the cascade connection of an analog to digital converter (ADC), a time domain equalizer (TEQ), a serial to parallel converter (SP'), a fourier transformer (FT'), a frequency domain equalizer (FEQ), a demapper (DEMAP), and a parallel to serial converter (PS'), said analog to digital converter (ADC) being adapted to digitize received signals to thereby generate a sequence of received discrete multi tone (DMT) symbols with a discrete multi tone (DMT) symbol length B, said time domain equalizer (TEQ) being adapted to digitally filter said received discrete multi tone (DMT) symbols to thereby compensate for intersymbol interference due to transmission over a transmission line (TL), said serial to parallel converter (SP') being adapted to parallelize said received discrete multi tone (DMT) symbols, said fourier transformer (FT') being adapted to transform said received DMT symbols to frequency domain, said frequency domain equalizer (FEQ) being adapted to digitally filter said received discrete multi tone (DMT) symbols to thereby compensate for phase and amplitude distortion due to transmission over said transmission line (TL), said demapper (DEMAP) being adapted to obtain a correct amount of bits from each carrier in said set of carriers which constitutes said received discrete multi tone (DMT) symbols, and said parallel to serial converter (PS') being adapted to serialize said received discrete multi tone (DMT) symbols and to thereby generate a sequence of received bits (RB), said fourier transformer (FT') comprising a windowing unit (WFU), a discrete fourier transform processor (DFT) coupled to said windowing unit (WFU) and an output terminal coupled to said discrete fourier transform processor (DFT), said windowing (WFU) including:

a. digital window filter (WI) adapted to window said received discrete multi tone (DMT) symbols with a window function (W) comprising a window head (HEAD) with head length H, a window body (BODY) whose length equals said discrete multi tone (DMT) symbol length B, and a window tail (TAIL) with tail length T, to thereby generate a sequence of windowed discrete multi tone (DMT) symbols;

is characterized in that said windowing unit (WFU) further includes:

b. a folding processor (F), coupled to said digital window filter (WI), and adapted to add a symbol head of said windowed discrete multi tone (DMT) symbols to a tail of a symbol body of said windowed discrete multi tone (DMT) symbols, and similarly to add a symbol tail of said windowed discrete multi tone (DMT) symbols to a head of said symbol body of said windowed discrete multi tone (DMT) symbols, to thereby constitute a sequence of folded windowed discrete multi tone (DMT) symbols with length B and to apply said sequence of folded windowed discrete multi tone (DMT) symbols to said output terminal.

In this way, by mapping in the windowed data symbols the information outside the window body, i.e. the information in the window head and window tail, into the window body, the number of discrete fourier transform points remains constant, although the total window width has increased.

It is remarked that a completely different solution to improve band-limited noise immunity, well known by persons skilled in the art, is based on the use of an adaptive digital notch filter, which detects the presence of single frequency interference or band-limited noise and which modifies its coefficients in such a way that the notch filter reduces the disturbances. Compared to the present invention, the technique with adaptive filters however is more sensitive to broadbanded noise on the transmission line.

The following describes different implementations of the present invention that can be considered.

In a first implementation the window head and window tail extend into and at most equal in length the prefixes and/or suffixes and/or symbol extensions which separate successive data symbols decreased by the equalized channel impulse response length. Such a prefix and/or suffix and/or symbol extension is inserted before transmission of the symbols over the transmission line. The symbol extension may be occupied by a cyclic extension such as is done in the field of ADSL, where discrete multi tone symbols are extended with cyclic prefixes to compensate for intersymbol interference on the transmission line. To fully compensate for intersymbol interference (ISI), the length of such a cyclic symbol extension at least equals the length of the equalized channel impulse response of the transmission line. If the sum of window head length, the window tail length and the equalized channel impulse response is smaller than or equal to the sum of the lengths of the prefix and/or suffix and/or symbol extension, windowing introduces no intersymbol interference. The prefix and/or suffix reduce the throughput capacity of the transmission line. Thus, there is a trade-off between leakage and throughput capacity of the transmission line.

If in addition the prefix and/or suffix contain cyclic extensions of the symbols, the window head and window tail can be chosen so that intercarrier interference is also avoided. Thereto, the window head has to be complementary to the tail of the window body and the window tail has to be complementary to the head of the window body. The window head and window tail may for instance be 1-complements of the tail and the head of the window body respectively, while the remaining part of the window body equals 1. In this way, carriers which fit in the window body, i.e. carriers for which the window body length B is an integer multiple of the period, are windowed identically by the enlarged window as by a rectangular window whose length equals the window body length. Consequently, if the window body length is made an integer multiple of the periods of all carriers constituting the incoming signal, the symbols carried by these carriers are left unmodified. Only disturbing carriers which do not fit exactly within the window body are bandfiltered, i.e. they influence only neighboring frequencies.

In a second implementation of the present invention, the sum of window head length, window tail length and equalized channel impulse response length exceeds the length of the prefix and/or suffix and/or symbol extension which separate successive data symbols. Windowing and folding at the receiver will introduce intersymbol interference and intercarrier interference in this second implementation. Indeed, the window head and window tail allow information of neighboring data symbols to enter the actually windowed data symbol thus introducing intersymbol interference. Moreover, the window head and window tail will no longer fully compensate the tail and the head of the window body respectively when folding since both deal with different information. As a result, a deterministic amount of intercarrier interference is introduced.

In many cases, a unique criterion to select the best implementation of the present invention does not exist. A balance has to be found between intersymbol interference, intercarrier interference, leakage and throughput capacity of the transmission line. Depending on the field wherein the present invention is applied, a certain window head length, window tail length, and prefix or suffix length for the data symbols will be chosen. In some cases, the best implementation might be obvious.

Yet another feature of the present invention is that it is suitable to be implemented in any field wherein data symbols are of the type of discrete multi tone (DMT) symbols, consisting of a plurality of carriers with equidistant frequencies.

Since the frequencies of the DMT carriers are related, the window body length can be chosen so that all DMT carriers perfectly fit in the window body. Any disturbing frequency component different from the DMT carrier frequencies will be filtered by the window, while the DMT carriers are left unmodified.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DETAILED DESCRIPTION OF PREFERRED EMBODIMENTS

Figure 1:
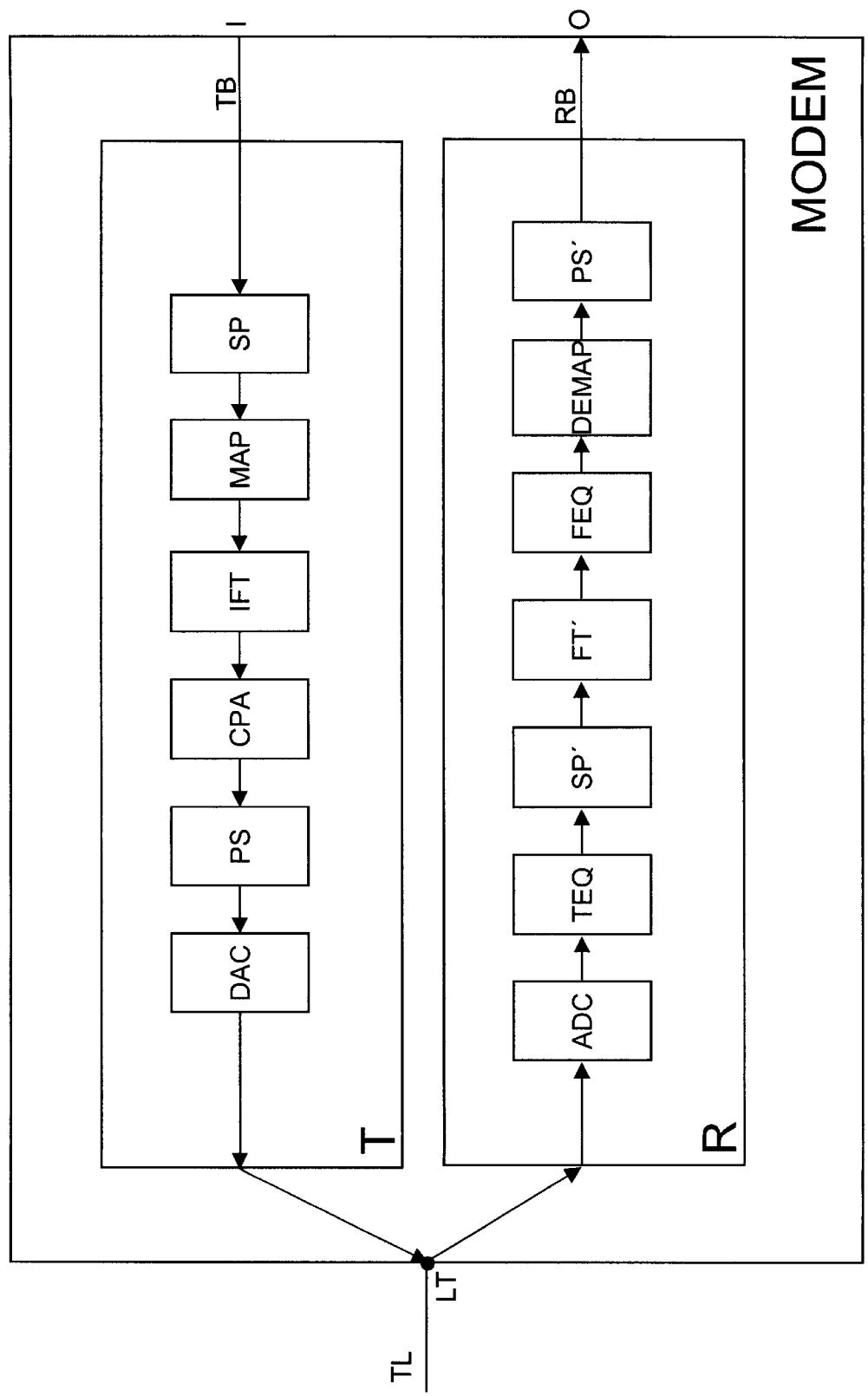
FIG. 1 represents a schematic block diagram of an embodiment of a discrete multi tone modem.

In the following paragraphs, an embodiment of the present invention will be described in a detailed way. First, the field of ADSL (Asymmetric Digital Subscriber Line) will be introduced, since the described embodiment forms part of a modem which is dedicated to be used in an ADSL environment. In addition, the problem of single frequency interference or band-limited noise will be discussed and known techniques to conquer this problem will briefly be mentioned. The shortcomings of the known techniques will be listed, and some paragraphs will be used to explain how the components of the modem, in accordance to the present invention, should be adapted to overcome the shortcomings of the known techniques. Furthermore, as will be seen, specific requirements depending on the field wherein the present invention is used, will allow the reader to select for his application the most suitable implementation of the present invention. Some guidelines will be given in the last paragraphs of this document and parameters which should be taken into account when selecting a particular implementation will be discussed.

DSL (Digital Subscriber Line) enables high speed digital data transport over telephone lines. In some applications such as ADSL (Asymmetric Digital Subscriber Line), this is done in overlay on the analog POTS (Plain Old Telephone Service) service. Thanks to ADSL, telephone companies can reuse most of their installed wiring for the introduction of new services. By using DMT (Discrete Multi Tone) modulation carriers with a higher signal to noise ratio (SNR) are allowed to carry more bits than carriers with a lower signal to noise ratio (SNR). As defined in the ANSI Standard on ADSL, entitled 'Asymmetric Digital Subscriber Line (ADSL) Metallic Interface Specification', published by the American National Standards Institute, Inc. (ANSI), DMT symbols are modulated on a set of 256 carriers with equidistant frequencies. Remark that the approved version of the above ANSI Standard on ADSL is referred to by ANSI as T1.413 and is entitled 'Network and Customer Installation Interfaces, Asymmetric Digital Subscriber Line (ADSL) Metallic Interface'. The modulation is performed by an inverse fast fourier transform processor.

A functional block scheme of a DMT (Discrete Multi Tone) modem such as the one used for ADSL is described in the article 'A Multicarrier E1-HDSL Transceiver System with Coded Modulation', written by Peter S. Chow, Naofal Al-Dhahir, John M. Cioffi and John A. C. Bingham, and published in the issue Nr. 3, May/June 1993 of the Journal of European Transactions on Telecommunications and Related Technologies (ETT), pages 257–266, and in the article 'Performance Evaluation of a Multichannel Transceiver System for ADSL and VHDSL Services' from Peter S. Chow et al., published in the issue Nr. 6, August 1991 of the Journal of European Transactions on Telecommunications and Related Technologies (ETT), pages 909–919. The main functional blocks are also drawn in FIG. 1.

The DMT modem MODEM of FIG. 1 is dedicated for FDM (Frequency Division Multiplexing) based ADSL and includes a transmitting part T and a receiving part R, both coupled via a line terminal LT of the modem MODEM to a twisted pair transmission line TL. The transmitting part T is constituted by the cascade connection of a serial to parallel converter SP, a mapper MAP, an inverse fourier transformer IFT, a cyclic prefix adder CPA, a parallel to serial converter PS and a digital to analog converter DAC. This cascade connection is coupled between a modem input I and the line terminal LT. The receiving part R on the other hand includes between the line terminal LT and a modem output O, the series connection of an analog to digital converter ADC, a time domain equalizer TEQ, a serial to parallel converter SP', a fourier transformer FT', a frequency domain equalizer FEQ, a demapper DEMAP, and a parallel to serial converter PS'. It has to be remarked that the contents of the modem MODEM is drawn by means of functional blocks only. The following paragraph describes the working of these functional blocks and will allow a person skilled in the art to manufacture the different functional blocks.

Transmit bits TB enter the modem MODEM via the input terminal I and are applied to the transmitting part T to be modulated on a set of carriers constituting DMT symbols.

The serial to parallel converter SP converts the incoming bit stream TB into a parallel bit stream. The mapper MAP then allocates the bits to the different carriers taking into account parameters such as for instance the signal to noise ratio (SNR) of the different carriers on the transmission line TL, the burst noise sensitivity of the different carriers, etc. Thus, at the output of the mapper MAP, 2 bits are e.g. modulated via 4 QAM (Quadrature Amplitude Modulation) on the first carrier, 8 bits are e.g. modulated via 256 QAM on the second carrier, and so on. The combined set of modulated carriers is called a DMT symbol. The inverse fourier transformer IFT in addition converts the set of carriers from frequency domain to time domain and the cyclic prefix adder CPA extends each DMT symbol with a fixed length cyclic prefix to reduce intersymbol interference (ISI) effects due to transmission over the transmission line TL. The parallel to serial converter PS generates a serial data stream by serializing successive DMT symbols. Before being applied to the transmission line TL, the serial stream is transformed into an analog signal by the digital to analog converter DAC.

In the opposite direction, received signals enter the receiving part R of the DMT modem MODEM via its line terminal LT to be converted into a serial stream of received bits RB. Thereto, the analog received signals are digitized in the analog to digital converter ADC, digitally filtered by the time domain equalizer TEQ, and paralleled by the serial to parallel converter SP'. This time domain equalizer TEQ digitally filters the data to compensate for intersymbol interference (ISI) on the transmission line TL and the serial to parallel converter SP' subtracts the cyclic prefix from the DMT symbols which form part of the received signals. The fourier transformer FT' additionally converts the DMT symbols from time domain to frequency domain and a second digital filter embedded in the frequency domain equalizer FEQ compensates for phase and amplitude distortion of the different carriers by the transmission line TL. The demapper DEMAP is aware of the bit constellation of each carrier and thus, referring to the above example, subtracts 2 bits from carrier 1 by 4 QAM demodulation, 8 bits from carrier 2 by 256 QAM demodulation, and so on. The parallel to serial converter PS' prepares the bit stream RB to be outputted via the modem output terminal O.

The functional blocks of FIG. 1 will not be described in further detail in this application since such details would be irrelevant with respect to the present invention. For more details about the implementation and working of the modem components, reference is made to the earlier cited articles. In what follows, one will concentrate on the problem of single frequency interference or band-limited noise on the transmission line TL, and to the structure of the fourier transformer FT' in the receiving part R of the modem MODEM.

To simplify the arguments, the description below does not take into account the discrete nature (in time) of the incoming sampled signal and of the fourier transformer FT'.

Figure 2:
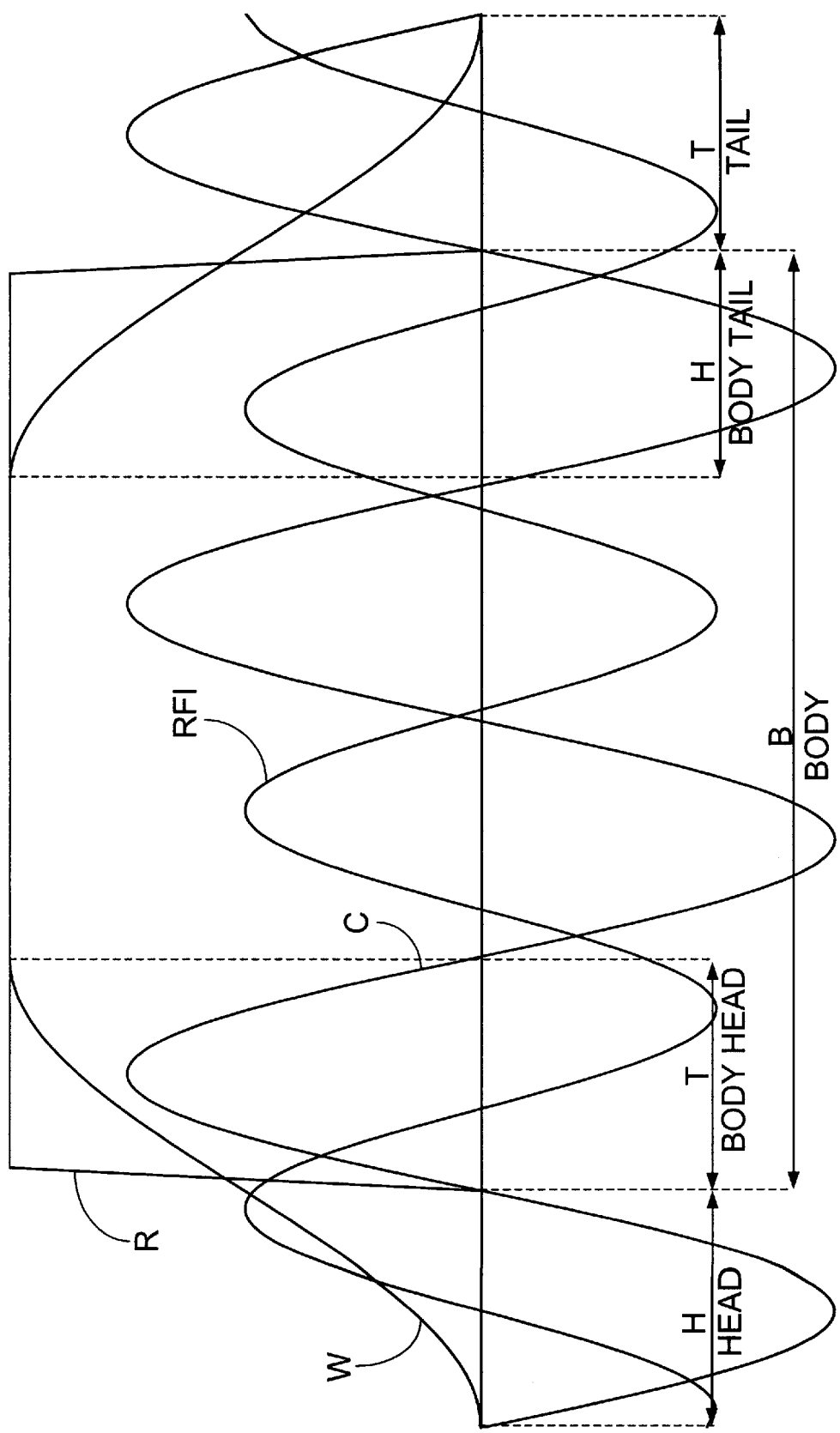
FIG. 2 represents a time domain diagram illustrating an implementation of the method according to the present invention.
Figure 3:
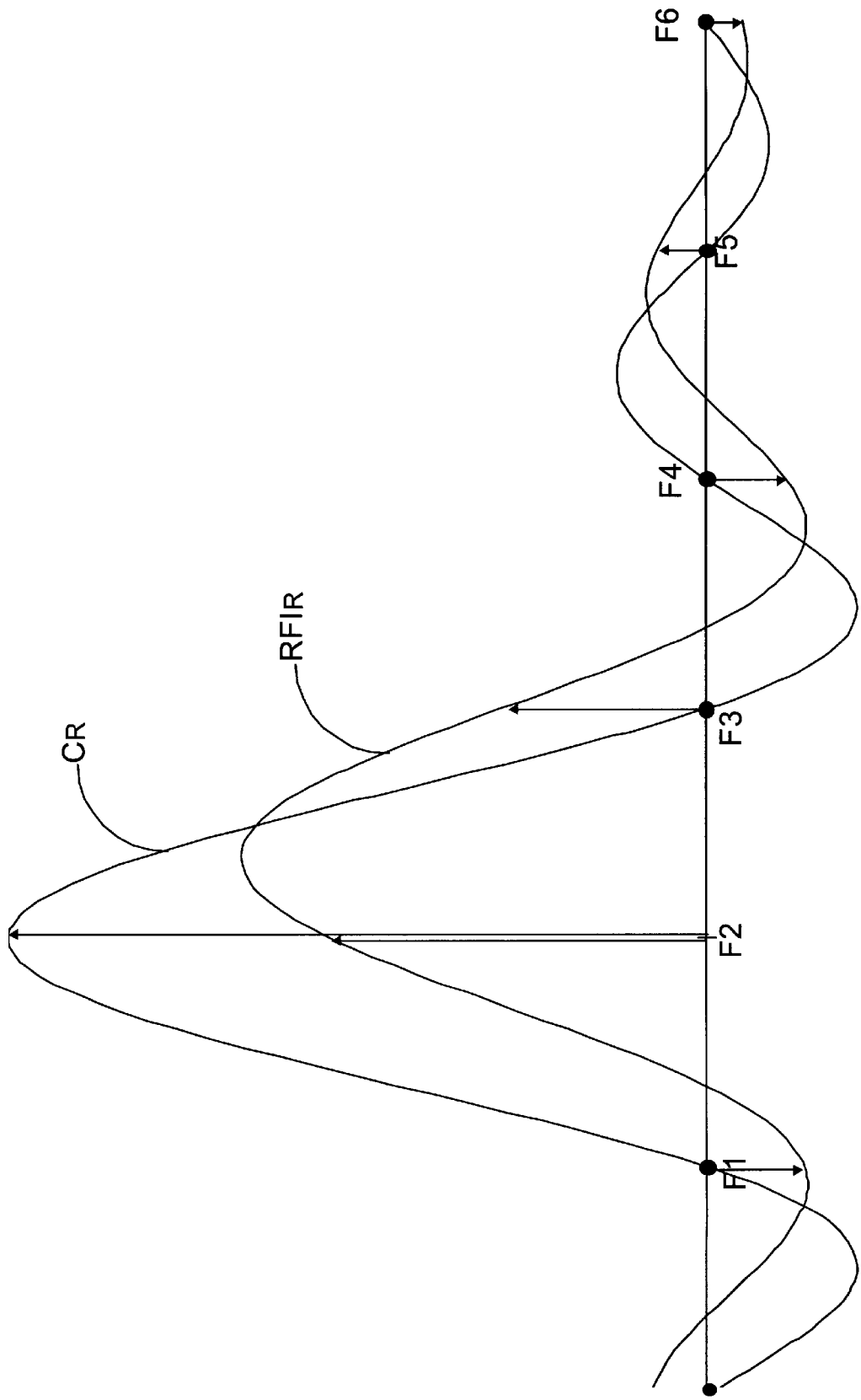
FIG. 3 represents a frequency domain diagram illustrating single frequency interference effects when using a rectangular window filter.

Single frequency noise or band-limited noise, e.g. single frequency metallic noise as mentioned on page 259, line 6 of the second column of the above mentioned article of Peter S. Chow, Naofal Al-Dhahir, John M. Cioffi and John A. C. Bingham, or radio frequency interference (RFI) coming from amateur radio broadcasts, may cause serious problems in digital subscriber loops. Since the above described multicarrier system can adaptively update its bit and energy allocation in the mapper MAP, performance degradation due to sinusoidal disturbances can be reduced by data re-allocation. Nevertheless, it should be clear that spectral leakage from one frequency to another in the fourier transformer FT' makes band-limited noise have an influence on all DMT carriers, also those carriers out of the spectral vicinity of the disturbances. This is illustrated by FIG. 2 and FIG. 3 which represent a time domain diagram and frequency domain diagram respectively. In FIG. 2, C represents the second carrier in the set of carriers which constitute the DMT symbols that are transmitted over the transmission line TL in FIG. 1. Its frequency is given by F2 on the frequency axis drawn in FIG. 3. The length B of a DMT symbol exactly equals twice the period of carrier C. To prepare DMT symbols for being fourier transformed, the fourier transformer FT' is equipped with a windowing unit, not drawn in FIG. 1. A rectangular window function R whose length equals the length B of a DMT symbol without cyclic prefix, is applied to the parallel bit stream entering the fourier transformer FT'. This rectangular window R windows successive DMT symbols. The effect of the rectangular window R, the shape of which is drawn in FIG. 2, on carrier C is illustrated by $C_R$ in FIG. 3. Indeed, in the frequency domain, the spectral component F2 is convolved with a sync shaped pulse which crosses the zero-axis in all frequencies . . . , F1, F3, F4, F5, F6, . . . of other carriers of the DMT symbols. The output of the fourier transformer FT' consists of samples of the resulting spectrum $C_R$ at the carrier frequencies. As a result, a rectangular window R having a length B which is an integer multiple of the periods of all carriers of the DMT symbols does not introduce intersymbol interference (ISI) or intercarrier interference (ICI).

FIG. 2 further shows a sinusoidal disturbance RFI. This disturbance, when windowed by the rectangular window R, also represents a sync pulse $RFI_R$ in the frequency domain. From FIG. 3, it is seen that this sync pulse $RFI_R$ has an impact on all carriers . . . , F1, F2, F3, F4, F5, F6, . . . of the DMT symbols. Since its value differs from zero in these frequencies . . . F1 . . . F6 . . . , the sync pulse $RFI_R$ adds a contribution to all DMT carriers. This effect is well known as spectral leakage. The amount wherein these carriers are disturbed by the interferer RFI is given by the vertical arrows drawn in FIG. 3.

The International application WO 94/21061 already cited in the opening part of the application, recognizes on page 11 the problem of spectral distortion due to leakage and mentions as a solution to reduce leakage, the well known technique of increasing the number of discrete fourier transform points through increasing the window width B using window functions with lower sidelobes than the rectangular window R. Consequently, the fourier transformation becomes more complex. Furthermore, as is also stated in this document, periodic noise components may be filtered before applying the window. A well known filter technique for instance is based on the use of adaptive equalizers. In such equalizers, the digital filter coefficients are modified to filter band-limited noise disturbances. Obviously, some detection means has to be provided to detect these disturbances. Such adaptive equalizers however are rather sensitive to broadbanded noise. Summarizing, both known techniques, increasing the number of DFT points or using adaptive equalizers involve shortcomings.

Figure 4:
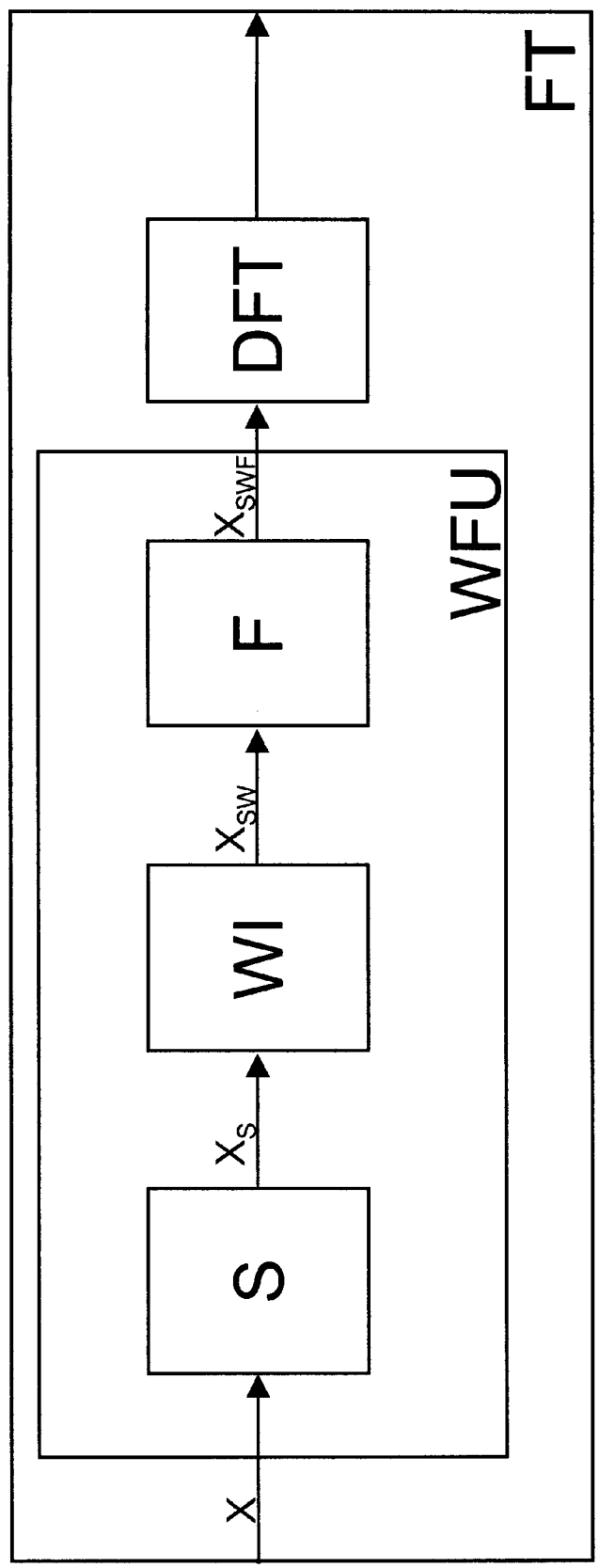
FIG. 4 represents a block scheme of an embodiment of a fourier transformer according to the present invention.

To avoid these shortcomings, the fourier transformer FT' in FIG. 1 has to be built up by components similar to those drawn in FIG. 4 for the fourier transformer FT. This fourier transformer FT includes a discrete fourier transform processor DFT preceded by a windowing and folding unit WFU. The windowing and folding unit WFU is constituted by a sampler of digitizer S, a window filter WI and a folding processor F. It is to be remarked that since the receiving part R in the modem MODEM of FIG. 1 already contains an analog to digital converter ADC, the sampler S has to be omitted in the structure of the fourier transformer FT, when replacing FT' in FIG. 1 thereby. In FIG. 4 the sampler S is included to clearly show the reader that a fourier transformer FT according to the present invention can be used as a stand alone unit and is thus not necessarily to be used in DMT modems or the like.

Compared to the above described rectangular filter R with window width B, the window function W (see FIG. 2) of the window filter WI of the windowing and folding unit WFU has an increased window width. A window head HEAD with head length H and a window tail TAIL with tail length T enlarge the rectangular window width to a global width of H+B+T. The edges of the enlarged window function W are smoothed which implies lower sidelobes for the frequency domain representation of W than for that of the rectangular window R. A smoothed window indeed contains less high frequency energy. As already said earlier, an enlarged and smoothed window function such as W introduces less leakage effects than the rectangular window R, but without further conditions, requires a more complex fourier transformation since the number of DFT points has increased. The increase of the amount of DFT points, as will become clear, is avoided by giving the window function W a particular shape and by the use of the folding processor F. The smoothed edges are shaped so that the window head HEAD is complementary to a tail BODY TAIL of the window body BODY with length H, and the window tail TAIL is complementary to a head BODY HEAD of the window body BODY with length T. The window body BODY is this part of the window function W which overlaps with the rectangular window R. The window body length thus equals the DMT symbol length of B samples. Mathematically, the complementary property of the window function W can be expressed as follows:

for i=0 to T-1; $W(i)+W(i+B)=1$
for i=B-H to B-1; $W(i)+W(i-B)=1$

Herein, i represents an integer index between O and T-1 in the head BODY HEAD of the window body BODY and between H-1 and B-1 in the tail BODY TAIL of the window body BODY, and W(i) represents a window filter sample with index i. If it is supposed that the DMT carriers exceed the original window length B, as is drawn for carrier C in FIG. 2, the effect of the window W is equal to that of the shorter rectangular window R on the condition that the samples of the carrier C windowed by the window head HEAD are added to the samples of the carrier C windowed by the tail BODY TAIL of the window body BODY and the samples of the carrier C windowed by the window tail TAIL are added to the samples of the carrier C windowed by the head BODY HEAD of the window body BODY. Indeed, the samples of the carrier C in the window head HEAD and window tail TAIL and those of the tail BODY TAIL and head BODY HEAD of the window body BODY respectively are identical and the window filter samples are each others complement. These additions are performed by the folding processor F. If k is an integer index value between 0 and T-1, following expression is valid for DMT carriers:

$WFU(Sk)=F(W(Sk))=(W(k)+W(B+k)) \cdot Sk = 1 \cdot Sk = Sk$

Herein, Sk represents the k'th sample of a DMT carrier and is equal to sample B+k of this DMT carrier since B is an integer multiple of the period of each DMT carrier; W(k) represents the k'th sample of the window function W; and WFU(Sk) represents the k'th sample of the DMT carrier after being processed by the windowing and folding unit WFU. It is clear that a similar expression can be written for the window body tail samples:

WFU(Sk)=Sk for k=B-H to B-1

For the remaining body samples (k=T to B-H-1) no folding is done and thus also for these samples the above expression holds:

WFU(Sk)=Sk for k=T to B-H-1

In FIG. 4, an incoming signal X is thus digitized by the sampler S. The so generated sample sequence $X_S$ includes extended DMT symbols of length H+B+T, which are windowed by the window filter WI. The window filter WI thereby transforms the sample sequence $X_S$ into a windowed sample sequence $X_{SW}$ wherein the windowed DMT symbols still have a length of H+B+T. This length is reduced to the original DMT symbol size B by the folding processor F which processes the windowed sample sequence $X_{SW}$ to generate a folded windowed sample sequence $X_{SWF}$. DMT carriers feel no difference in being treated by the rectangular window R or by the enlarged window function W combined with the folding processor F. The number of DFT points per symbol at the output of the windowing and folding unit WFU equals that of the symbols at the output of the rectangular window R in traditional solutions. For all other frequency components, the use of an appropriate window reduces the leakage effects significantly. One condition nevertheless has to be fulfilled: the DMT carriers have to span the entire window length H+B+T. If the sum of head length H, tail length T and equalized channel impulse response length does not exceed the length of prefix and/or suffix and/or symbol extension, the above condition is fulfilled. It is to be noted that the prefix and/or suffix that separate subsequent symbols are added to these symbols together with the cyclic symbol extension by the cyclic prefix adder CPA in FIG. 1.

An alternative implementation does not extend the data symbols with a prefix and/or suffix but allows the windowing and folding unit WFU to introduce a certain amount of intersymbol interference (ISI) and a deterministic amount of intercarrier interference (ICI). Indeed, the enlarged window W function will make successive data symbols overlap via the head HEAD and tail TAIL, thus introducing intersymbol interference (ISI). Furthermore, the folding processor F now adds together samples of the data carriers which are no longer identical. This causes intercarrier interference (ICI). In an improved version of this implementation, the deterministic amount of intercarrier interference (ICI) that is introduced by windowing and folding is compensated by DSP (Digital Signal Processing) techniques, well known in the art. Means to perform such DSP techniques are not shown in any of the figures but for a person skilled in the art it is obvious how such means can be inserted in the described modem MODEM.

The above few paragraphs prove that there is no unique criterion, allowing the reader to select the optimal implementation of the present invention. Depending on the requirements of this application, allowable intersymbol interference, allowable intercarrier interference, required RFI immunity and minimum throughput capacity of the transmission line, he will have to define a head length H, tail length T, and prefix and/or suffix length for the symbols, suitable for his application.

It has to be remarked that the windowing technique described above is also valid for applications different from ADSL (Asymmetric Digital Subscriber Line) such as VDSL (Very High Speed Digital Subscriber Line), HDSL (High Speed Digital Subscriber Line), SDSL (Symmetrical Digital Subscriber Line), and so on. It is obvious to a person skilled in the art that the described technique can be used in relation with transmission techniques different from DMT (Discrete Multi Tone) such as for instance OFDM (Orthogonal Frequency Division Multiplexing).

Also remark that the applicability of the present invention is not restricted the field of telephone lines. The above called transmission line can be replaced by any transmission medium.

In addition, it has to be noticed that although the above described modem MODEM is provided with an analog to digital converter and digital to analog converter, the windowing technique, subject of the present invention, is not restricted to be applied to digital data. Analog windowing and folding of analog signals to reduce leakage effects is also possible.

While the principles of the invention have been described above in connection with specific apparatus, it is to be clearly understood that this description is made only by way of example and not as a limitation on the scope of the invention.

What is claimed is:

1. A method to reduce leakage in a fourier transformer (FT), said method comprising the steps of:
    a. receiving an incoming signal (X) comprising data symbols with a data symbol length B; and
    b. windowing said incoming signal (X) by multiplying it with a window function (W) to thereby generate a sequence of windowed data symbols ($X_{SW}$), said window function (W) comprising a window head (HEAD) with a head length H, a window body (BODY) with a body length which equals said data symbol length B, and a window tail (TAIL) with a tail length T, said windowed data symbols ($X_{SW}$) having a length H+B+T, characterized in that said method further comprises the step of:
    c. adding a symbol head of said windowed data symbols ($X_{SW}$) to a tail of a symbol body of said windowed data symbols ($X_{SW}$), and similarly adding a symbol tail of said windowed data symbols ($X_{SW}$) to a head of said symbol body of said windowed data symbols ($X_{SW}$) to thereby generate a sequence of folded windowed data symbols ($X_{SWF}$) whose length equals said data symbol length B.

2. A method according to claim 1, characterized in that, in said incoming signal (X), successive data symbols are separated by one or more of a prefix, a suffix, and a symbol extension whereby a complete length of said one or more of prefix, suffix, and symbol extension equals a sum of said head length H, said tail length T and an equalized channel impulse response length of a transmission line (TL) over which said incoming signal (X) is transmitted.

3. A method according to claim 2, characterized in that said symbol extension is a cyclic extension, added to said data symbols to reduce intersymbol interference (ISI) due to transmission of said incoming signal (X) over said transmission line (TL).

4. A method according to claim 3, characterized in that, in said window function (W), said window head (HEAD) is complementary to a tail (BODY TAIL) of said window body (BODY), and said window tail (TAIL) is complementary to a head (BODY HEAD) of said window body (BODY), and in that either one or both said prefix and said suffix are cyclic extensions of said data symbols.

5. A method according to claim 1, characterized in that, in said incoming signal (X), successive data symbols are separated by one or more of a prefix, a suffix, and a symbol extension whereby a complete length of said one or more of prefix, said suffix, and said symbol extension is smaller than a sum of said head length H, said tail length T and an equalized channel impulse response length of a transmission line (TL) over which said incoming signal (X) is transmitted.

6. A method according to claim 1, characterized in that said data symbols are discrete multi tone (DMT) symbols.

7. A windowing unit (WFU) for reducing leakage in a fourier transformer (FT), said windowing unit (WFU) including:
    a. an input terminal adapted to receive an incoming signal (X) comprising data symbols with a data symbol length B; and
    b. a window filter (WI), coupled to said input terminal, and adapted to window said incoming signal (X) by multiplying it with a window function (W) comprising a window head (HEAD) with head length H, a window body (BODY) whose length equals said data symbol length B, and a window tail (TAIL) with tail length T, to thereby generate a sequence of windowed data symbols ($X_{SW}$) whose length equals H+B+T, characterized in that said windowing unit (WFU) further includes:
    c. a folding processor (F), coupled to said window filter (WI), for adding a symbol head of said windowed data symbols ($X_{SW}$) to a tail of a symbol body of said windowed data symbols ($X_{SW}$), and similarly to add a symbol tail of said windowed data symbols ($X_{SW}$) to a head of said symbol body of said windowed data symbols ($X_{SW}$), to thereby constitute a sequence of folded windowed data symbols ($X_{SWF}$) whose length equals said data symbol length B.

8. A fourier transformer (FT) comprising a windowing unit (WFU) and a discrete fourier transform processor (DFT) coupled to said windowing unit (WFU), said windowing unit (WFU) including:
    a. an input terminal adapted to receive an incoming signal (X);
    b. a sampling device (S) adapted to sample said incoming signal (X) to thereby generate a sample sequence ($X_S$) comprising data symbols with a data symbol length of B samples, B being an integer value; and
    c. a digital window filter (WI), coupled to said sampling device (S), and adapted to window said sample sequence ($X_S$) by multiplying it with a window function (W) comprising a window head (HEAD) with head length H, a window body (BODY) whose length equals said data symbol length B, and a window tail (TAIL) with tail length T, to thereby generate a sequence of windowed data symbols ($X_{SW}$) whose length equals H+B+T; and
    d. an output terminal coupled to said discrete fourier transform processor (DFT), characterized in that said windowing unit (WFU) further includes:
    e. a folding processor (F), coupled to said digital window filter (WI), for adding a symbol head of said windowed data symbols ($X_{SW}$) to a tail of a symbol body of said windowed data symbols ($X_{SW}$), and similarly to add a symbol tail of said windowed data symbols ($X_{SW}$) to a head of said symbol body of said windowed data symbols ($X_{SW}$), to thereby constitute a sequence of folded windowed data symbols ($X_{SW}$) with length B and to apply said sequence of folded windowed data symbols ($X_{SWF}$) to said output terminal.

9. A discrete multi tone (DMT) modem (MODEM) comprising between a line terminal (LT) and a modem output (O) a receiving part (R), and between a modem input (I) and said line terminal (LT) a transmitting part (T), said transmitting part (T) including the cascade connection of a serial to parallel converter (SP), a mapper (MAP), an inverse fourier transformer (IFT), a cyclic prefix adder (CPA), a parallel to serial converter (PS) and a digital to analog converter (DAC), said serial to parallel converter (SP) being adapted to parallelize a sequence of transmit bits (TB), said mapper (MAP) being adapted to allocate said transmit bits (TB) to a set of carriers to thereby constitute discrete multi tone (DMT) symbols, said inverse fourier transformer (IFT) being adapted to transform said discrete multi tone (DMT) symbols to time domain, said cyclic prefix adder (CPA) being adapted to add a cyclic prefix to said discrete multi tone (DMT) symbols to thereby protect said discrete multi tone (DMT) symbols for intersymbol interference, said parallel to serial converter (PS) being adapted to serialize said discrete multi tone (DMT) symbols to thereby generate a sequence of discrete multi tone (DMT) symbols, and said digital to analog converter (DAC) being adapted to convert said sequence of DMT symbols to analog signals, and said receiving part (R) including the cascade connection of an analog to digital converter (ADC), a time domain equalizer (TEQ), a serial to parallel converter (SP'), a fourier transformer (FT'), a frequency domain equalizer (FEQ), a demapper (DEMAP), and a parallel to serial converter (PS'), said analog to digital converter (ADC) being adapted to digitize received signals to thereby generate a sequence of received discrete multi tone (DMT) symbols with a discrete multi tone (DMT) symbol length B, said time domain equalizer (TEQ) being adapted to digitally filter said received discrete multi tone (DMT) symbols to thereby compensate for intersymbol interference due to transmission over a transmission line (TL), said serial to parallel converter (SP') being adapted to parallelize said received discrete multi tone (DMT) symbols, said fourier transformer (FT') being adapted to transform said received DMT symbols to frequency domain, said frequency domain equalizer (FEQ) being adapted to digitally filter said received discrete multi tone (DMT) symbols to thereby compensate for phase and amplitude distortion due to transmission over said transmission line (TL), said demapper (DEMAP) being adapted to obtain a correct amount of bits from each carrier in said set of carriers which constitutes said received discrete multi tone (DMT) symbols, and said parallel to serial converter (PS') being adapted to serialize said received discrete multi tone (DMT) symbols and to thereby generate a sequence of received bits (RB), said fourier transformer (FT') comprising a windowing unit (WFU), a discrete fourier transform processor (DFT) coupled to said windowing unit (WFU) and an output terminal coupled to said discrete fourier transform processor (DFT), said windowing (WFU) including:

a. digital window filter (WI) adapted to window said received discrete multi tone (DMT) symbols with a window function (W) comprising a window head (HEAD) with head length H, a window body (BODY) whose length equals said discrete multi tone (DMT) symbol length B, and a window tail (TAIL) with tail length T, to thereby generate a sequence of windowed discrete multi tone (DMT) symbols;

characterized in that said windowing unit (WFU) further includes:

b. a folding processor (F), coupled to said digital window filter (WI), and adapted to add a symbol head of said windowed discrete multi tone (DMT) symbols to a tail of a symbol body of said windowed discrete multi tone (DMT) symbols, and similarly to add a symbol tail of said windowed discrete multi tone (DMT) symbols to a head of said symbol body of said windowed discrete multi tone (DMT) symbols, to thereby constitute a sequence of folded windowed discrete multi tone (DMT) symbols with length B and to apply said sequence of folded windowed discrete multi tone (DMT) symbols to said output terminal.

10. A discrete multi tone (DMT) modem (MODEM) according to claim 9, characterized in that said cyclic prefix adder (CPA) further is adapted to add to each said discrete multi tone (DMT) symbol an additional prefix and/or suffix to reduce intersymbol interference due to folding by said folding processor (F).

* * * * *

UNITED STATES PATENT AND TRADEMARK OFFICE
CERTIFICATE OF CORRECTION

PATENT NO. : 6,240,129 B1
DATED : May 29, 2001
INVENTOR(S) : Peter Reusens et al.

It is certified that error appears in the above-identified patent and that said Letters Patent is hereby corrected as shown below:

Column 12,
Line 59, delete "$(X_{SW})$" and substitute -- $(X_{SWF})$ -- therefor.

Signed and Sealed this

Ninth Day of April, 2002

Attest:

Attesting Officer

JAMES E. ROGAN
Director of the United States Patent and Trademark Office